United States Patent [19]

Gerson et al.

[11] Patent Number: 5,253,269
[45] Date of Patent: Oct. 12, 1993

[54] DELTA-CODED LAG INFORMATION FOR USE IN A SPEECH CODER

[75] Inventors: Ira A. Gerson, Hoffman Estates; Mark A. Jasiuk, Chicago, both of Ill.

[73] Assignee: Motorola, Inc., Schaumburg, Ill.

[21] Appl. No.: 755,265

[22] Filed: Sep. 5, 1991

[51] Int. Cl.⁵ .............................................. H04B 14/06
[52] U.S. Cl. ........................................ 375/28; 381/31
[58] Field of Search ......................... 375/27, 28, 122; 381/31; 341/143, 155, 200; 370/118; 358/133

[56] References Cited

U.S. PATENT DOCUMENTS

| | | | |
|---|---|---|---|
| 4,831,636 | 5/1989 | Taniguchi et al. | 375/27 |
| 4,933,957 | 6/1990 | Bottau et al. | 375/27 |

OTHER PUBLICATIONS

"Vector Sum Excited Linear Prediction (VSELP) Speech Coding at 8 KBPS" Ira A. Gerson and Mark A. Jasiuk 1990 IEEE pp. 461–464.

Primary Examiner—Curtis Kuntz
Assistant Examiner—Tesfaldet Bocure
Attorney, Agent, or Firm—Steven G. Parmelee; John W. Hayes; Susan L. Lukasik

[57] ABSTRACT

Lag information for use in a speech coder is developed by estimating lag values for the various subframes (201) of a speech coding frame (200) of information, and by then selecting lag values for each subframe that are both closely corresponding to the estimated lag values and that also observe the restrictions of a selected delta-coding routine. When a plurality of candidate sets of such information have been developed, they are compared against one another to identify that set which appears to provide the best set of lag values. This information is then available for framing and transmission. In one embodiment, the sets of candidate values are also selected to ensure provision for subsequent adjustment in either a positive or negative direction. With this adjustability capability so provided, closed-loop adjustments can be made with respect to the selected values to ensure that the ultimately transmitted coding for the lag value most closely corresponds to an ultimate output that most closely represents the speech signal to be represented.

19 Claims, 3 Drawing Sheets

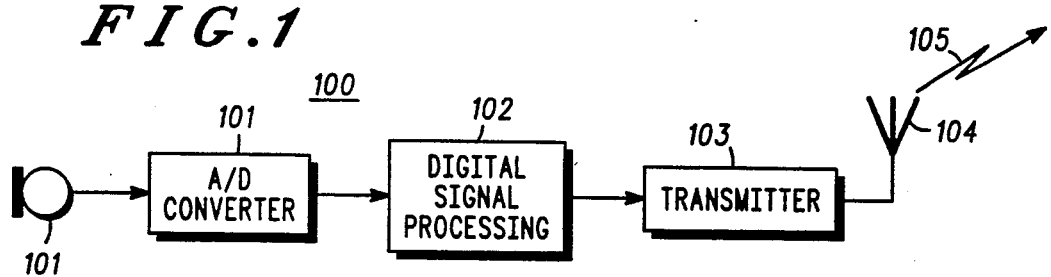
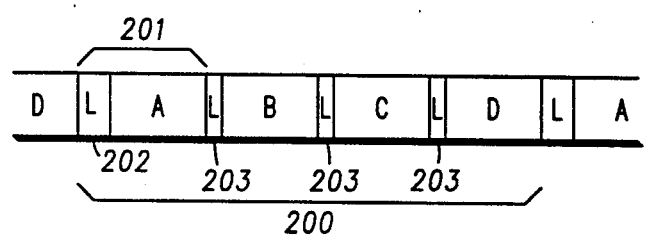
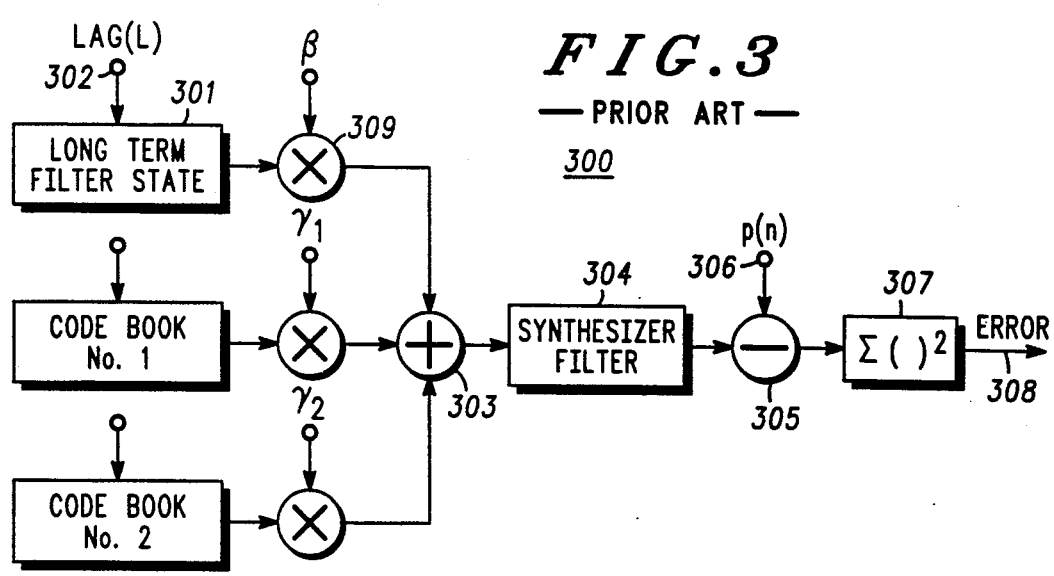

DELTA-CODED LAG INFORMATION FOR USE IN A SPEECH CODER

FIELD OF THE INVENTION

This invention relates generally to speech coding, including but not limited to preparation of certain speech coding parameters for transmission.

BACKGROUND OF THE INVENTION

Communication resources such as radio frequency channels are ultimately limited in capacity. Notwithstanding this limitation, communication needs continue to rapidly increase. Dispatch, selective call, and cellular communications, to name a few, are all being utilized by an increasing number of users. Without appropriate technological advances, many users will face either impaired service or possibly a complete lack of available service.

One recent technological advance intended to increase the efficiency of data throughput, and hence decrease system capacity needs to thereby allow more communications to be supported by the available limited resources, is speech coding. For example, code excited linear prediction speech coders and vector sum excited linear prediction speech coders have been proposed that exhibit good performance at relatively low data rates. Rather than transmitting the original voice information itself, or a digitized version thereof, such speech coders utilize techniques to allow a coded representation of the voice information to be transmitted instead. Utilizing the coded representation upon receipt, the voice message can then be reconstructed. For a general description of one version of such a device, see U.S. Pat. No. 4,933,957 to Bottau et al., which describes a low bit rate voice coding method and system.

In code excited linear prediction (CELP) type coders, long term predictor delay (lag) constitutes one of the parameters that requires encoding. This lag indicates a delay at which long term signal correlation is typically maximized. The various coder parameters and other information are typically transmitted in a plurality of subframes at a given frame rate, and in prior art coders, the lag parameter is typically coded independently and updated at the subframe rate. The frame parameters typically include the linear prediction coefficients, whereas the subframe parameters more typically define the excitation. In a CELP type coder, these excitation parameters include the lag factor, the index of the code vector, and various relevant gains.

When representing voiced speech, the lag factor typically exhibits a high degree of correlation from one subframe to another. By coding the lags independently from subframe to subframe, the prior art has failed to properly exploit this high degree of correlation.

Some prior art suggestions have been offered that attempt to exploit this subframe to subframe lag correlation. Pursuant to these suggestions, the lag information is coded more compactly. To date this compactness has been gained at the cost of reduced long term predictor performance. Such prior art methods typically include coding the lag once per frame (usually every 15-30 milliseconds) with a third order long term predictor being used. If the taps of the long term predictor filter are updated at the subframe rate, a lag change of at most two samples can be accommodated over the duration of the frame. An alternate method sends the frame lag, and codes the long term predictor lag deviations relative to the frame lag at each subframe. Yet another method, described in Federal Standard 1016, codes the lag independently at odd subframes, and employs delta-coding relative to the preceding subframe's coded lag at even subframes.

While successfully reducing the number of bits assigned to code the lag information, each of the above described methods results in a compromise to speech quality performance and/or coding efficiency. A need therefore exists for an improved method and apparatus for efficient encoding of long term predictor lag information, where the gained efficiency does not necessarily result in performance degradation. The reduction in bits utilized to represent the lag information could then either support a reduced coding rate speech coder, or the bit savings could be exploited to employ additional error correction for other information contained within the voice coding.

SUMMARY OF THE INVENTION

These and other needs are substantially met through provision of a method for providing long term predictor delay information as disclosed herein. Pursuant to this method, a digitized audible sample is represented in a predetermined number of subframes containing representational information. Estimated lag factors for each subframe are then provided, based on this digitized audible sample. Multiple sets of candidate revised lag factors are then developed by, for each set, initially providing, for a selected one of the subframes, a lag factor value that closely corresponds to an estimated lag factor for the selected subframe, and then subsequently providing revised lag factor values for subframes other than the selected one subframe, all while remaining compatible with a predetermined delta-coding routine. Following this, a particular set of candidate revised lag factors that most closely corresponds to a predetermined acceptance criterion is selected.

In one embodiment of the invention, the delta-coding routine provides that lag factor information for a selected one of the subframes can be any of a predetermined plurality of values within a first predetermined range, with each other subframe then being restrained to a value that is within a second predetermined range of an immediately adjacent subframe. Typically, the second predetermined range will be smaller than the first predetermined range.

In another embodiment of the invention, when the sets of candidate revised lag factors are developed in a manner that assures compatibility with the delta-coding routine, one also ensures that each subsequently provided subframe lag factor value can be subsequently further adjusted by at least a predetermined amount. When such adjustability has been ensured, the above described method can be further enhanced by allowing subsequent adjustment of the revised lag factors, which adjusted lag factors are then utilized to provide samples of synthesized speech. These samples can then be compared against a predetermined criterion to identify a set of adjusted lag factors that most closely meets a particular acceptance criterion. (In the alternative, of course, these synthesizing and comparison steps can be appropriately mathematically modeled and similar results achieved.)

So provided, lag information can be minimally represented while simultaneously ensuring that substantially correct lag information will nevertheless be available for use in reconstructing the original voiced information.

BRIEF DESCRIPTION OF THE DRAWINGS

FIG. 1 comprises a block diagram of a radio using speech coding in accordance with the invention;

FIG. 2 comprises a depiction of a voice coding frame in accordance with the invention;

FIG. 3 comprises a block diagram illustrative of the lag parameter selection mechanism in accordance with the invention;

DESCRIPTION OF A PREFERRED EMBODIMENT

Figure 4:
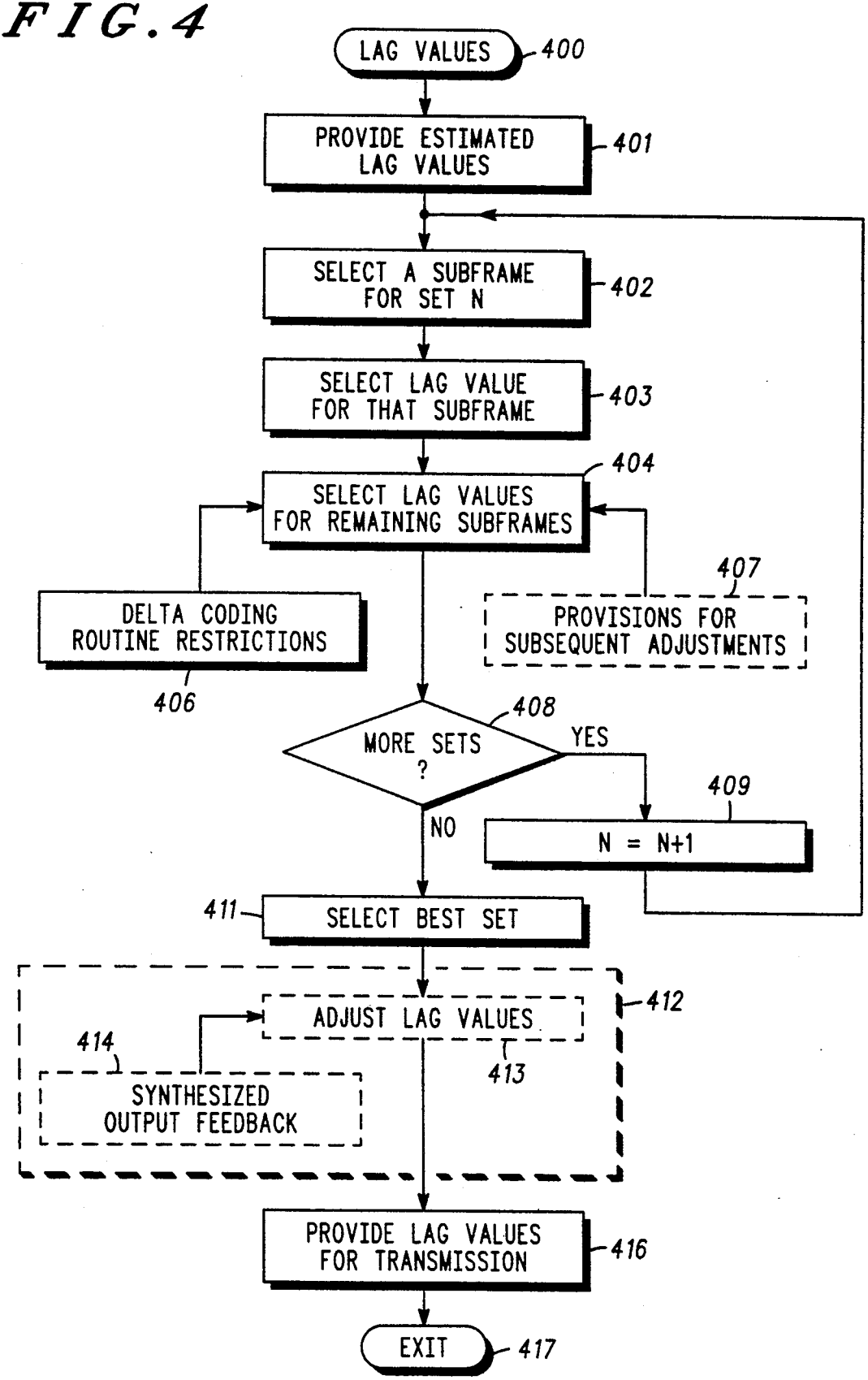
FIG. 4 comprises a flow diagram depicting the lag selection process in accordance with the invention.

In FIG. 1, a radio transmitter generally configured in accordance with this invention for preparing and transmitting a speech coded signal appears generally as depicted by reference numeral 100. This radio (100) includes a microphone (101) for receiving an original voice signal intended for transmission, and an analog-to-digital converter (101) that converts the analog voice signal into an appropriate digital representation. A digital signal processor (102), such as a DSP-56000 family device (as manufactured and sold by Motorola, Inc.) receives the digitized representation and performs a variety of functions in order to render a signal appropriate for transmission. These functions include analyzing and representing the speech input in accordance with the speech coding scheme of choice, and appropriately framing that information for transmission. A transmitter (103) receives the framed speech coded information and utilizes this as a modulation signal to be applied to a carrier signal (105) of choice. In this embodiment, the carrier signal (105) constitutes a radio frequency carrier as radiated from an antenna (104).

All of the above generally referred to components are well known and understood in the art, both individually and in the general configuration and application depicted. Therefore, additional explanatory material will not be provided here.

As noted earlier, subframes and frames are utilized to transmit speech coding information. A particular frame structure pertinent to an understanding of this embodiment appears in FIG. 2. Here, four subframes (201) comprise a single frame (200). Each subframe A, B, C, and D includes various kinds of speech coding information and parameters suitable to allow synthesis of an intended speech message at a receiver. In this context, each subframe A, B, C, and D includes a field for containing lag information (202 and 203). In this particular embodiment, the first subframe (A) has an 8 bit field (202) for containing lag information, with the remaining subframes (B, C, and D) having only a four hit field (203) each for containing this information. As will be explained in more detail below, delta-coding allows this configuration.

The digital signal processing unit (102) referred to in FIG. 1 constitutes a programmable platform. The particular functions supported by the digital signal processing unit (102) therefore vary in a temporal manner. Nevertheless, in accordance with well accepted industry standard, the general functioning of such a digital signal processing platform will be described here, where pertinent to an understanding of this embodiment, by reference to a block diagram as generally depicted in FIG. 3 by reference numeral 300.

The block diagram (300) embodiment suitable to support selection of all of the excitation vectors appropriate to a code excited linear prediction speech coder, including both vector sum excited linear prediction code book values and the long term filter state. With only the latter being of interest here, further description of the other code books, and the manner by which a particular excitation parameter based thereon is selected, will not be presented here. For further information regarding the latter, the interested reader is referred to the article appearing in the April, 1990 copy of the I.E.E.E. publication, Proceedings of the International Conference on Acoustics, Speech and Signal Processing, entitled "Vector Sum Excited Linear Prediction (VSELP) Speech Coding At 8KBPS", by Ira Gerson and Mark Jasiuk, pages 461-464, a copy of which is appended hereto as Appendix 1.

FIG. 3 depicts an appropriate platform for allowing selection of lag information suitable for inclusion in the speech coding subframes described above. The long term filter state (301) provides pitch related excitation information in response to corresponding lag information (302). After being subjected to an appropriate weighting factor (309) and being combined with excitation information (303) from other sources, a synthesis filter (304) utilizes this excitation information to produce a synthesized speech sample, all as well understood in the art. A comparator (305) compares this sample against an appropriate test sample (306), such as the original speech sample, and an error determining block (307) provides an output signal (308) representative of the degree to which the synthesized sample and the test sample fail to wholly correlate.

As will be described below in more context and detail, in this embodiment, this process can be repeated (in a mathematically modeled context if desired) for a variety of candidate lag values, and the error results for each then compared to identify that lag value which ultimately yields the most accurate synthesized speech result.

With the above capabilities in mind, the lag selection process (400) will now be described in more detail with reference to FIG. 4. The reader is reminded that the steps described FIG. 4 are appropriately carried out in the digital signal processing unit (102) described in FIG. 1, with many of the steps utilizing the programmed platform described in FIG. 3.

To begin, at least one estimated lag value is provided (401) for each subframe based on the digitized audible sample. By way of simplified example, and referring to FIG. 5, each subframe A, B, C, and D is provided with an estimated lag factor (501A-D). This estimated lag factor should correlate closely to the original digitized audible sample, but may itself be inappropriate for coding due to delta-coding limitations and/or lack of resolution with respect to those lag factors that can actually be sent. For example, in FIG. 5, the estimated lag factor (501A) for subframe A does not coincide precisely with any of the available lag factor value levels M, M+1, M+2, and so forth. Instead, this particular estimated lag factor (501A) appears to fall between level M and level M+1. Accordingly, the resolution of the levels themselves are ultimately inadequate to precisely reflect the estimated level (501A) itself. (In the alternative, one could select the estimated lag factors such that they would initially coincide with the available value levels, and this particular issue would be substantially resolved.)

Referring again to FIG. 4, the process next selects a particular subframe, which subframe will serve as a delta-coding anchor for set N (402). Any of subframes A-D can be the selected subframe. For purposes of this example, subframe A will serve as the first selected subframe.

Figure 5:
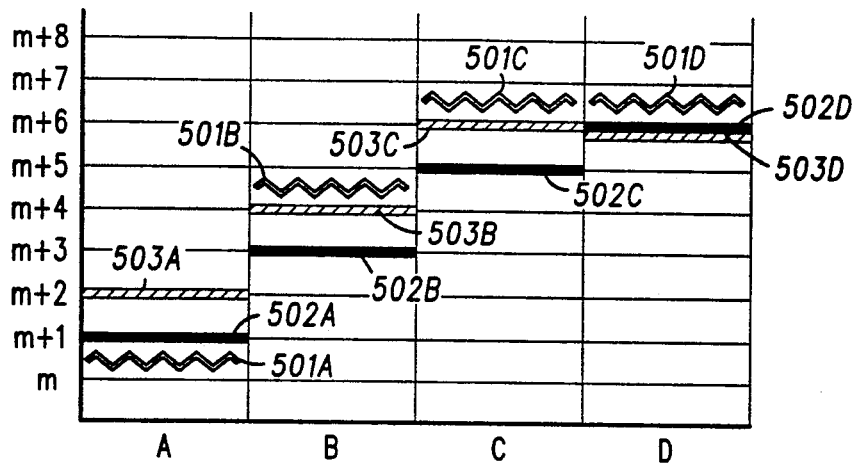
FIG. 5 comprises a diagram illustrating an aspect of the lag selection process in accordance with the invention.

The process then selects a lag value for the selected subframe (403). With reference to FIG. 5, the candidate revised lag factor for this first set of candidate lag factors can be seen as depicted by reference numeral 502A. As shown, the candidate revised lag factor (502A) has been selected to reside in close proximity to the estimated lag factor (501A).

Figure 6:
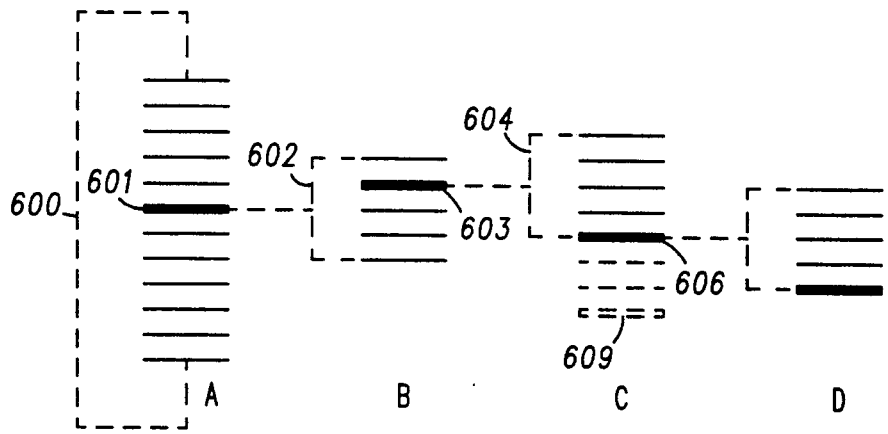
FIG. 6 constitutes a general depiction illustrative of a delta-coding technique in accordance with the invention.

Referring again to FIG. 4, the process then selects lag value for the remaining subframes (404). When selecting these other lag values, in order to complete a selection of candidate lag factors for this first set, the process ensures that the values selected are compatible with the delta-coding routine that will ultimately be utilized to encode this information for transmission (406). With reference to FIG. 6, a delta-coding routine in general will first be described, with the specifics of this particular delta-coding scheme following. Pursuant to this delta-coding approach, the lag factor in a particular selected subframe (in this example subframe A) can be represented as any of 256 different levels (600), this limit and the resulting resolution being determined by the 8 bits that are utilized to encode the anchor lag value. In this example, the level denoted by reference numeral 601 comprises the lag value for subframe A.

The lag value for the next adjacent subframe (subframe B) must fall within a predetermined range (602) of the previous lag value (601). In this simplified example, this predetermined range (602) comprises plus or minus two discrete levels on either side of the anchor value (601). Further specific to this example, the particular value selected for subframe B appears as plus one level (603) above the previous level (601). In a similar manner, the next subframe (subframe C) must have a lag value (606) that again falls within the predetermined range (604) of the immediately preceding subframe value (603).

FIG. 6 also illustrates another point that should be kept in mind. The lag values must be assigned within the delta-coding restraints, even when this results in an inaccurate representation. For example, in subframe C, although a different level (609) might, in this particular instance, more accurately correspond to the estimated lag value, the selected lag value (606) can approach this desired level no more closely than as allowed within the delta-coding range (604). Because of this, many prior art approaches that utilize delta-coding begin with a relatively accurate representation of the lag values, which representation becomes progressively less accurate with subframe depth. As will be made more clear below, the described embodiment alleviates much of this inherent problem.

(It should be clear that other criteria for selecting a particular revised lag value could be used. For instance, the lags could be chosen by evaluating, for subframes other than the initially selected subframe, a plurality of lag values that meet the delta coding requirements, and choosing these lag values that maximize a performance criterion.)

In this particular embodiment, with 8 bits being available to define the anchor value and with 4 bits being available in each subsequent subframe to represent the delta information, 256 discrete levels are available to represent the subframe A information, with subsequent subframes being allowed to deviate between plus 7 levels and minus 8 levels for a total of 16 levels.

Referring now again to FIG. 5, and remaining consistent with this simplified example, the remaining lag values for subframes B-D are selected to be: 1) proximal to the estimated lag factor for that particular subframe; and 2) consistent with the delta-coding routine restrictions. With these restraints in mind, and presuming for purposes of illustration only that the delta-coding restrictions are as depicted in FIG. 6 (i.e., the subsequent values can be plus or minus two levels from a preceding anchor point), it can be seen that subframe B will be provided with a lag value (502B) that is less than optimal with respect to the estimated lag factor (501B) for that subframe. Similarly, the candidate revised lag factor (502C) for subframe C will be inadequate, with the candidate revised lag factor (502D) for subframe D appearing more appropriately placed. Therefore, given the delta-coding routine restrictions, and an initial starting point as selected in subframe A, it can be seen that the first set of candidate revised lag filters has two subframes relatively well represented, and two subframes that are not.

Returning to FIG. 4, the process then determines whether additional sets of candidate revised lag factors are to be developed (408). In this particular embodiment, 8 candidate sets are typically created in the above manner. Therefore, presuming that only one set of candidates has been created, the process increments the set number (409) and again initiates the above described process. This process can begin with the same initial subframe, or with a different subframe. If the same subframe is utilized, then a different beginning candidate revised lag factor will typically be utilized.

Referring again to FIG. 5, for purposes of this example, subframe B has been selected as a starting point, with a candidate revised lag factor (503B) for this second set having been selected, which candidate (503B) is more proximal to the estimated lag factor (501B) than the candidate from the previous set (502B). Backing up to subframe A, the delta-coding routine restrictions would require subframe A revised lag factor (503A) to be no closer to the estimated lag factor (501A) than as depicted.

Moving forward, subframes C and D can accommodate candidate revised lag factors (503C and 503D) as depicted. So selected, the second set of candidate revised lag factors have three subframes (B, C, and D) accurately represented, with only one subframe (subframe A) being less than optimally represented.

Returning to FIG. 4, when the requisite number of sets of candidate revised lag factors have been determined, the process then selects the best set (411). In this particular embodiment, the best set comprises that set which most accurately corresponds to the previously estimated lag factors (or, in the alternative, that set which otherwise maximizes a predetermined performance criterion to thereby yield a best performing set of pitch predictors for the frame). Given the above example, where only two candidate sets are considered, set two most closely corresponds to the estimated lag factors, since set 2 corresponds closely in three subframes, whereas set 1 corresponds closely in only two subframes. Therefore, in this simple example, set two would be selected as the best set.

Up to this point, the selection process has proceeded in what may be considered an open-loop context, in that the revised factors are selected and compared in relation to previously estimated but likely appropriate lag values. Many benefits of the invention can be realized by simply utilizing the resultant lag values from the selected set and providing these values for transmission (416). So configured, this process for selecting lag values would then conclude (417). As a result, delta-coding techniques can be utilized to minimize coding requirements and hence either reduce the effective coding rate for the speech coding scheme in general, or to make additional bits available for other purposes relevant to either quality and/or robustness. At the same time, the creation of various candidate sets, all of which comply with the delta-coding requirements, followed by a subsequent selection of one set that most accurately represents the initial information, assures that the use of delta-coding will not typically unduly compromise the quality of the ultimately conveyed information. Therefore, the reduced coding requirement benefits are gained without an otherwise expected commensurate drop in quality.

Figure 7:
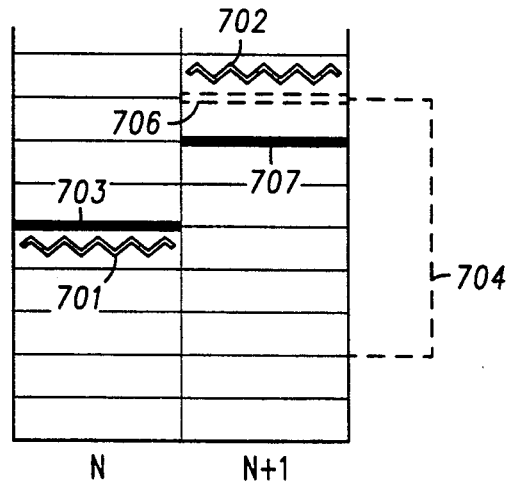
FIG. 7 comprises a diagram illustrating another aspect of the lag selection process in accordance with the invention.

In another embodiment of the invention, when selecting lag values for remaining subframes during construction of a set of candidate factors (404), in addition to assuring that the selected lag values remain consistent with the delta-coding routine restrictions (406), the process can also ensure that the values are selected to ensure that subsequent adjustments can also be made (407). For example, with reference to FIG. 7, a candidate lag factor (703) has been selected for subframe N, given a particular estimated lag factor (701) for that particular subframe. The next subframe (N+1) can have a lag factor value that falls within the delta-coding range (704), which for this particular example is plus or minus three levels. Given, in this particular example, that subframe N+1 has an estimated lag factor (702) positioned as indicated, the above described methodology would likely locate the candidate revised lag factor at the position indicated by reference numeral 706. This position would be both proximal to the estimated lag factor (702) and within the delta-coding allowable range (704). Pursuant to this additional requirement, wherein provision for subsequent adjustment is ensured, however, the selected candidate revised value will instead be positioned as indicated by reference numeral (707). So positioned, the selected candidate revised lag factor (707) can later be adjusted, if desired, in either the positive or negative direction by at least one level. If the adjustment level to be assured were plus or minus two levels, then the selected level would of course be yet another level away from the estimated lag factor (702).

Subsequent ability to adjust in either direction for all revised lag factors is therefore assured. Following selection of the best set of candidate revised lag factors (411) as described above, the process can then initiate what effectively amounts to a closed-loop consideration (412) of the selected revised lag factors. In particular, the process can adjust each of the revised lag factors, within limits of the predetermined adjustment range (in this case, plus or minus one level) (413), and these adjusted lag values are utilized to drive the synthesis filter (304) of FIG. 3 in order to generate synthesized voice samples. Using the platform of FIG. 3, the digital signal processing unit (102) can determine an error value by comparing the synthesized output to an appropriate acceptance criterior, such as the original speech sample itself. By adjusting these various lag values (413) as indicated, and by taking account of the synthesized output feedback (414), the process can effectively fine tune the selected set in order to more fully optimize the lag factor representation.

The latter embodiment obtains not only the benefits of the first embodiment, but often yields an even more accurate encoded representation of the lag information.

What is claimed is:

1. A method for providing long term predictor delay information, comprising the steps of:
   A) representing a digitized audible sample in a predetermined number of subframes of representational information;
   B) providing estimated lag factors for each subframe based on the digitized audible sample;
   C) providing a delta-coding routine such that lag factor information for a selected one of the subframes can be any of a predetermined plurality of values within a first predetermined range, and with each other subframe being restrained to a value that is within a second predetermined range of an immediately adjacent subframe, wherein the second predetermined range is smaller than the first predetermined range;
   D) developing sets of candidate revised lag factors by:
      i) initially providing for a selected one of the subframes a lag factor value that closely corresponds to an estimated lag factor for the selected subframe;
      ii) subsequently providing for subframes other than the selected one subframe lag factor values while:
         a) simultaneously remaining compatible with the delta-coding routine;
      iii) repeating steps D(i) and D(ii) to thereby provide sets of candidate revised lag factors;
   E) selecting a particular set of candidate revised lag factors that most closely corresponds to a predetermined acceptance criterion to provide a set of revised lag factors.

2. The method of claim 1, wherein step A provides for representing the digitized audible sample in four subframes of representational information.

3. The method of claim 1, wherein the first predetermined range of step C encompasses 256 discrete values.

4. The method of claim 3, wherein the second predetermined range of step C encompasses 16 discrete values.

5. The method of claim 4, wherein the values that are restrained to a value that is within the second predetermined range must further be a value that is no more than seven value levels above and no more than eight values below the value in the immediately preceding subframe.

6. The method of claim 1, wherein step D(iii) further provides for a sufficient number of repetitions of steps D(i) and (ii) to provide a number of sets of candidate revised lag factors that is at least equal to the predetermined number of subframes.

7. The method of claim 1, wherein step D(ii) further includes the step of:
b) ensuring that each subsequently provided subframe lag factor value can be subsequently further adjusted by at least a predetermined amount.

8. The method of claim 7, and further including the steps of:
F) adjusting the revised lag factors of the set of revised lag factors to provide adjusted lag factors; G) using the adjusted lag factors to provide a representation of synthesized speech that corresponds to each adjustment;
H) comparing the representation against a predetermined criterion to identify a set of adjusted lag factors that most closely meets a particular acceptance criterion.

9. The method of claim 8, wherein step A provides for representing the digitized audible sample in four subframes of representational information.

10. The method of claim 8, wherein the first predetermined range of step C encompasses 256 discrete values.

11. The method of claim 10, wherein the second predetermined range of step C encompasses 16 discrete values.

12. The method of claim 11, wherein the values that are restrained to a value that is within the second predetermined range must further be a value that is no more than seven value levels above and no more than eight values below the value in the immediately preceding subframe.

13. The method of claim 8, wherein step D(iii) further provides for a sufficient number of repetitions of steps D(i) and (ii) to provide a number of sets of candidate revised lag factors that is at least equal to the predetermined number of subframes.

14. A method for providing long term predictor delay information, comprising the steps of:
A) representing a digitized audible sample in four subframes of representational vo-coding information;
B) providing estimated lag factors for each subframe based on the digitized audible sample;
C) providing a delta-coding routine such that lag factor information for a selected one of the subframes can be any of a predetermined plurality of values within a first predetermined range of 256 discrete values, and with each other subframe being restrained to a value that is within a second predetermined range of 16 discrete values of an immediately adjacent subframe;
D) developing sets of candidate revised lag factors by:
i) initially providing for a selected one of the subframes a lag factor value that closely corresponds to an estimated lag factor for the selected subframe;
ii) subsequently providing for subframes other than the selected one subframe lag factor values while:
a) simultaneously remaining compatible with the delta-coding routine;
iii) repeating steps D(i) and D(ii) to thereby provide sets of candidate revised lag factors;
E) selecting a particular set of candidate revised lag factors that most closely corresponds to a predetermined acceptance criterion to provide a set of revised lag factors.

15. The method of claim 14, wherein step D(ii) further includes the step of:
b) ensuring that each subsequently provided subframe lag factor value can be subsequently further adjusted by at least a predetermined amount.

16. The method of claim 15, and further including the steps of:
F) adjusting the revised lag factors of the set of revised lag factors to provide adjusted lag factors;
G) using the adjusted lag factors to provide a representation of synthesized speech that corresponds to each adjustment;
H) comparing the representation against a predetermined criterion to identify a set of adjusted lag factors that most closely meets a particular acceptance criterion.

17. A vo-coding device, comparing:
A) input means for receiving an audible sample;
B) conversion means operably coupled to the input means for receiving the audible sample and for providing a digitized audible sample in response thereto;
C) digital signal processing means operably coupled to the conversion means for vo-coding the digitized audible sample, the digital signal processing means including:
i) long term filter state means for receiving a lag factor and for providing pitch related linear prediction filter excitation information from said lag factor;
ii) framing means for framing vo-coding information representing the digitized audio sample, including lag factor information, in a plurality of subframes;
iii) first means for providing an initially estimated lag factor value for each of the subframes based on the digitized audible sample;
iv) delta-coding means for delta-coding the lag factor values in some, but not all, of the subframes pursuant to a predetermined delta-coding routine;
v) set development means for:
initially providing for one of the subframes a lag factor value that closely corresponds to the initially estimated lag factor value for the selected subframe; and
subsequently providing for subframes other than the selected one subframe lag factor values while simultaneously remaining compatible with the delta-coding routine; a plurality of times to thereby provide a plurality of sets of candidate revised lag factors; and
vi) selection means for selecting a particular set of candidate revised lag factors that most closely corresponds to a predetermined acceptance criterion to provide a set of revised lag factors.

18. The vo-coding device of claim 17, wherein the set development means further functions to subsequently provide for subframes other than the selected one subframe lag factor values for the other subframes while also simultaneously ensuring that each subsequently provided subframe lag factor value can be subsequently further adjusted by at least a predetermined amount.

19. The vo-coding device of claim 18, wherein the digital signal processing means further includes:

vi) adjustment means for adjusting the revised lag factors of the set of revised lag factors to provide adjusted lag factors;

vii) second means for using the adjusted lag factors to provide a representation of synthesized speech that corresponds to each adjustment; and viii) comparison means for comparing the representation against a predetermined criterion to identify a set of adjusted lag factors that most closely meets a particular acceptance criterion.

* * * * *